Figures 1, 2:
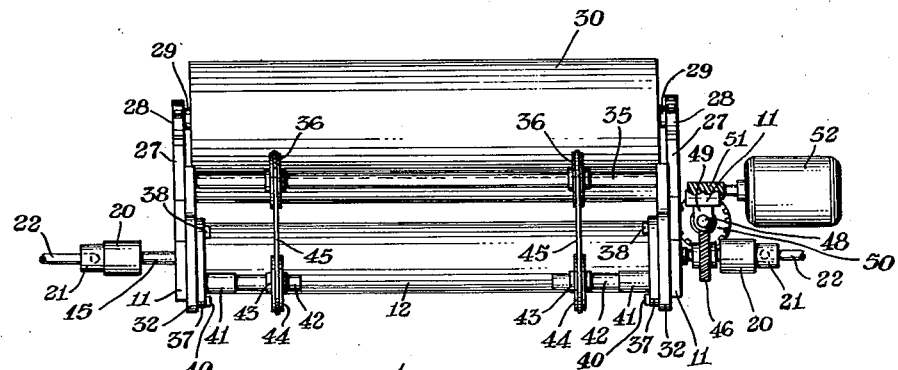

Oct. 22, 1957    M. O. LONGSTRETH ET AL    2,810,423
APPARATUS FOR LAMINATING THERMOPLASTIC FILM SHEETS
Filed May 2, 1955    2 Sheets-Sheet 1

INVENTORS
Murrey O. Longstreth
BY Gilbert J. Ward

Griswold & Burdick
ATTORNEYS

Oct. 22, 1957 M. O. LONGSTRETH ET AL 2,810,423
APPARATUS FOR LAMINATING THERMOPLASTIC FILM SHEETS
Filed May 2, 1955 2 Sheets-Sheet 2

INVENTORS
Murrey O. Longstreth
BY Gilbert J. Ward

Griswold & Burdick
ATTORNEYS

United States Patent Office 2,810,423
Patented Oct. 22, 1957

2,810,423

APPARATUS FOR LAMINATING THERMOPLASTIC FILM SHEETS

Murrey O. Longstreth and Gilbert J. Ward, Midland, Mich., assignors to The Dow Chemical Company, Midland, Mich., a corporation of Delaware Application May 2, 1955, Serial No. 505,296

1 Claim. (Cl. 154—1)

This invention relates to apparatus for laminating sheets of film of thermoplastic materials. More particularly, it relates to apparatus for laminating film sheets at least one of which is an oriented film sheet.

There are many reasons for laminating film sheets. One sheet may provide a hard weatherproof surface to a desirable sheet but otherwise too soft for normal wear. Again, a sheet may provide an attractive appearance to a tough but dull sheet. Thus, two or more sheets are laminated together to take advantage of the most desirable characteristics and properties of each. The properties of the laminated article are frequently greater than the sum of the properties of the individual sheets. In previous methods of laminating sheets the sheets were pressed together either hot, to cause a fusion between sheets, or by means of an adhesive. When a thin oriented sheet was heat-laminated to a relatively thick unoriented sheet the heat would shrink the oriented film, causing an uneven surface to be formed on the laminate. When it was attempted to laminate two sheets under conditions such that there would be no shrinkage, it was impossible to remove all the wrinkles, and other unevenness from the film, so that a rough surface was again produced. Frequently, the very problem that was to be solved by lamination was the elimination of a matte or uneven surface, and consequently the prior methods of lamination did not achieve the desired result.

An object is the provision of a laminating apparatus capable of continuous operation and which may be employed in conjunction with a thermoplastic sheet-producing apparatus.

The above and related objects are achieved with a process comprising the steps of supplying a hot unoriented sheet of thermoplastic material between the nip of two smooth pressure rolls, at least one of which is heated, and supplying an oriented thermoplastic film sheet compatible with the other about the heated roll, while holding the edges of the film under tension, and into pressure contact with the first sheet at the nip between the two rolls. The heated roll shrinks the oriented sheet only to the extent of removing any wrinkles and slack portions of the film. Since the edges of the sheet are restrained, the film does not shrink out of size but retains its original size. Thus, when the heated film is brought into contact with the unoriented sheet the film is smooth and taut, and the surface of the resulting laminate is likewise smooth and polished.

It is preferred to heat both rolls to insure a more uniform and complete fusion of the sheets. It is also preferred to employ at least a 3-roll calender stack and to pass the laminated sheet successively through the several nips between the rolls. In this way the laminated sheet is kept in contact with the rolls long enough to aid in setting the interface of the laminate.

Figure 3:
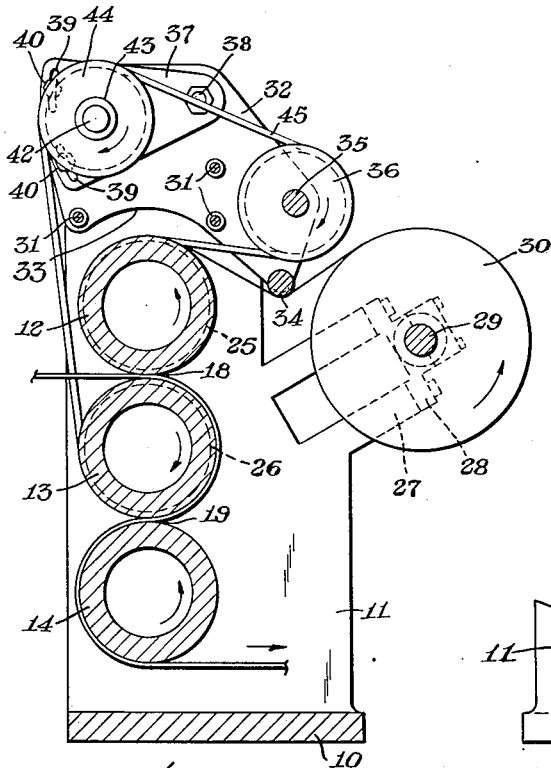
Figure 4:
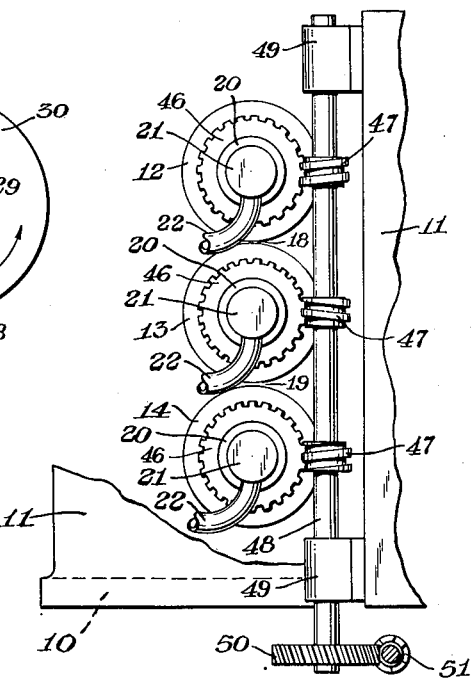
Figure 5:
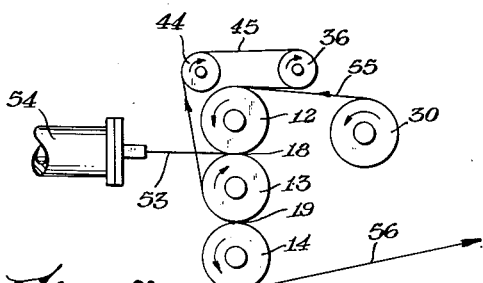

The processs will be more readily understood from the drawing and following descripton of the apparatus which may be used for carrying out the process. In the drawings, Fig. 1 is a front elevation of a preferred apparatus;
Fig. 2 is a plan of the apparatus;
Fig. 3 is a cross-section along line 3—3 of Fig. 1;
Fig. 4 is a view taken along line 4—4 of Fig. 1, showing the means for driving the rolls; and,
Fig. 5 is a diagrammatic sketch of the apparatus employed in conjunction with a sheet extruder.

In the illustrated embodiment a supporting frame is provided with a bed 10 and two upright members 11 for supporting the working members of the apparatus. Three rolls 12, 13, 14 are supported horizontally on shafts 15, 16, 17 extending through bearings in the upright members 11. The rolls 12, 13, 14 are positioned in pressure relationship to have a narrow nip 18, 19 between each pair. The rolls 12, 13, 14 may be provided with heating or cooling means. As illustrated, the rolls 12, 13, 14 and shafts 15, 16, 17 are hollow, so that heat transfer fluids may be passed therethrough. At the end of each shaft 15, 16, 17 is a rotatable seal 20 in conjunction with a union 21. The union 21 in turn is connected to a flexible hose 22 which leads to a supply of heat transfer fluids.

Companion grooves 25, 26 are provided about the periphery of the two upper rolls 12, 13 near the roll ends. Each groove 25 in the upper roll 12 is in vertical alignment with a corresponding groove 26 in the adjacent roll 13.

Extending backward and upward angularly from the back edge of each supporting member 11 and integral therewith and at approximately the same height as the upper roll 12 is a projection 27 of the supporting member 11 (Fig. 3). In the illustrated embodiment each such projection consists of two arms 27 to the ends of which are bolted split bearings 28. Extending through the bearings 28 is a shaft 29 which acts as a core for a roll of film 30.

Fastened to the upper part of each supporting member 11 is a bracket 32 (Fig. 2), extending over the upper roll 12 so that at the rearward edge of the bracket 32, the extremity of its lower surface 33 is at lower level than the upper line of the roll 12. The lower rearward ends of brackets 32 support the ends of a horizontal shaft 34 at a level slightly below that of the upper line of the upper roll 12. The shaft 34 is preferably freely rotatable and serves as a guide and tension roll for thin film sheets. However, it may be fixed and highly polished so that the film may slip past it.

Located directly above the shaft 34 is a rotatable horizontal shaft 35 extending through bearings in the brackets 32, carrying two sheaves 36 mounted in the same vertical planes as the grooves 25, 26 in the upper two rolls 12, 13.

Attached on the inner side of each bracket 32 is a generally triangular tension adjusting plate 37, pivoted near its apex about a bolt 38 located in the vertical plane tangent to the rear side of the rolls 12, 13, 14. Curved slots 39 are cut into the forward edge of the plate 37 through which bolts 40 are inserted into threaded holes in the bracket 32. The plate 37 can thus be pivoted up or down a distance equal to the length of the slots 39 and locked in a fixed position. Welded near the forward edge of each plate 37 is a boss 41 into which is inserted a jackshaft 42. Mounted on a freely rotating bearing 43 keyed to the jackshaft 42 is a sheave 44. Each sheave 44 is in the same vertical plane as one of the grooves 25, 26 in the rolls 12, 13 and sheave 36. An endless cable 45 is passed over and around first sheave 36 then along the groove 25 in the upper roll 12, through the nip 18 between the upper two rolls 12, 13, along the groove 26 in the opposite side of the middle roll 13, and through the nip 19 between the lower two rolls 13, 14. The cable 45 then passes over and around the second sheave 44 from where it returns to the first sheave 36.

To move the sheets of film and the cable the rolls 12, 13, 14 are driven at approximately the same speed. Any suitable drive mechanism may be employed. In the illustrated embodiment (Fig. 4), a pinion gear 46 is keyed to the drive end of each of the shafts 15, 16, 17. Meshed with each of the gears 46 is a worm gear 47 mounted on a vertical driveshaft 48. The driveshaft 48 is mounted in bearings 49 carried by upright member 11. Keyed to the lower end of driveshaft 48 is a driven gear 50 which is meshed with a worm gear 51 mounted on a driven shaft such as that of motor 52.

A means for supplying the base sheet 53 of thermoplastic material to be laminated must be provided. A convenient means for providing the base sheet is a sheet expressing extruder 54. In this way separate storing, and handling operations are eliminated and a hot sheet suitable for laminating operations is provided directly. Such an arrangement is illustrated diagrammatically in Figure 5.

In operation, a roll 30 of oriented film is mounted on shaft 29 in split bearings 28. The free end of the film 55 is fed over roll 12 with the edges gripped by cable 45. A hot unoriented sheet 53 is fed into nip 18 between rolls 12 and 13 between cables 45. Roll 12 is heated and roll 13 is cooled to set the fused laminated interface. As roll 12 rotates the film 55 is brought into contact with the unoriented sheet 53 at nip 18. The pressure exerted by rolls 12 and 13 and the heat present causes the two sheets to be laminated by fusion. The laminated sheet 56 is then passed around roll 13 into the nip 19 between rolls 13 and 14 from which point it is carried away from the apparatus.

In actual operation, an unoriented sheet 53 was extruded from a composition of polystyrene and 5 percent GRS synthetic rubber. The unoriented sheet had a matte finish after extrusion. This sheet was laminated, by means of the process of this invention, to a highly glossy oriented film of polystyrene and the resulting laminate had the high gloss finish of the polystyrene film and was wrinkle-free.

By way of contrast, when the process was repeated with the restraining cables omitted from the apparatus, the oriented polystyrene film shrunk unevenly and wrinkled. The resulting laminate was commercially useless because of its rough surface.

We claim:

Apparatus for laminating two sheets of compatible organic thermoplastic compositions, one of which is oriented, comprising a stack of at least three driven calender rolls, an adjacent pair of rolls of said stack having circumferential grooves near each end of each of said rolls, the grooves in adjacent rolls being in the same vertical plane; two pairs of sheaves mounted above said stack and with one member of each pair on each side of said stack and in the plane through one of said grooves; and endless cable extending about one of the sheaves of each pair thence over and half around the outer roll of the grooved pair, said cable lying in the groove thereon; thence through the nip between the grooved rolls, half around the other grooved roll, thence around the second sheave and returning to the first sheave; means for supplying hot unoriented plastic sheet to the nip between the grooved rolls and means for supplying oriented plastic film of a width greater than the distance between said grooves over the outer grooved roll and under the said endless cables.

References Cited in the file of this patent

UNITED STATES PATENTS

| | | |
|---|---|---|
| 1,383,267 | Escobales | June 28, 1921 |
| 1,913,330 | Brickman | June 6, 1933 |
| 1,998,866 | Fowler | Apr. 23, 1935 |
| 2,397,838 | Chavannes | Apr. 2, 1946 |
| 2,429,177 | Young | Oct. 14, 1947 |
| 2,434,541 | Bierer | Jan. 13, 1948 |
| 2,594,229 | Snyder et al. | Apr. 22, 1952 |
| 2,690,590 | Goulding Jr. et al. | Oct. 5, 1954 |